United States Patent [19]
Parker et al.

[11] Patent Number: 5,542,705
[45] Date of Patent: Aug. 6, 1996

[54] DUAL COMPENSATING STABILIZER

[75] Inventors: Eric G. Parker, Elgin, Ill.; Donald P. Hardy, Fort Wayne, Ind.

[73] Assignee: Illinois Tool Works Inc., Glenview, Ill.

[*] Notice: The term of this patent shall not extend beyond the expiration date of Pat. No. 5,302,034.

[21] Appl. No.: 136,336

[22] Filed: Oct. 14, 1993

[51] Int. Cl.$^6$ .................................................. B62D 9/02
[52] U.S. Cl. ........................ 280/772; 280/112.2; 280/104
[58] Field of Search ............................... 280/772, 112.2, 280/104, 687, 688, 840, 703; 446/95

[56] References Cited

U.S. PATENT DOCUMENTS

| | | | |
|---|---|---|---|
| 2,840,387 | 6/1958 | Orlandi | 280/104 |
| 2,950,122 | 8/1960 | Erickson | 280/104 |
| 2,969,246 | 1/1961 | Erickson | 280/203 |
| 3,459,436 | 8/1969 | Rusconi | 280/104 |
| 3,826,514 | 7/1974 | Kolbe | 280/112.2 |
| 5,230,529 | 7/1993 | Harvey-Bailey | 280/772 X |
| 5,324,056 | 6/1994 | Orton | 280/772 X |

FOREIGN PATENT DOCUMENTS

| | | | |
|---|---|---|---|
| 2646379 | 11/1990 | France | 280/772 |

*Primary Examiner*—Christopher P. Ellis
*Attorney, Agent, or Firm*—Trexler, Bushnell, Giangiorgi & Blackstone, Ltd.

[57] ABSTRACT

A stabilizing system for use with a vehicle suspension which employs a first and second strap or other flexible tension member associated with and extending between opposite control arm assemblies of the suspension. A first end of each strap is anchored to a corresponding control arm assembly. A second end, distal the first end, of each strap is anchored to the control arm assembly distal the first end. Each strap, alternately, weaves over and under at least two guides associated with and positioned between the path of the straps. The guides and/or bushings associated with the anchor points may be formed of a yieldable material to provide a yieldable biasing action on the straps. An adjustment assembly is associated with each strap to preload the associated strap to a desired tension. The stabilizing system occupies space between the control arm assemblies and is very lightweight due to the thin belt-like characteristics of the straps. The stabilizing system of the present invention functions to transfer forces imposed on one control assembly to the opposite control arm assembly by alternately placing an associated strap in tension or allowing the other strap to go slack. The flexible tension members or straps are preferably connected to the control arms at locations tending to minimize the effect of single wheel impact loads.

8 Claims, 2 Drawing Sheets

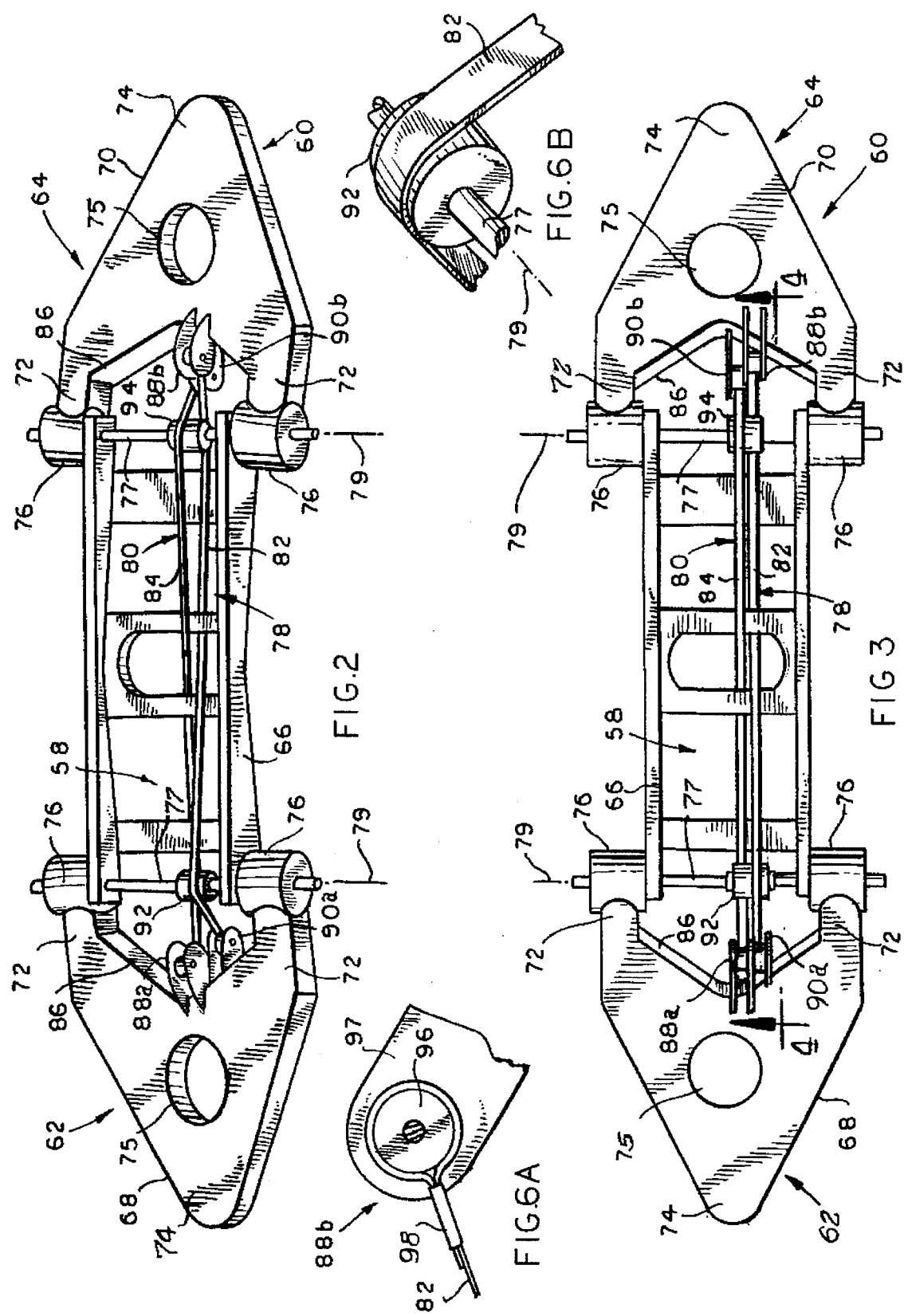

DUAL COMPENSATING STABILIZER

BACKGROUND

The present invention relates to a stabilizing system for use with a vehicle. More particularly, the present invention pertains to a stabilizing system for use in resisting rolling motion of a vehicle.

A variety of suspension systems are available to minimize and control the vibrations, jostling, as well as other vehicle displacements such as roll associated with a moving vehicle. A vehicle suspension system usually includes a suspension assembly positioned between opposing wheels of the vehicle and attached to the vehicle inboard of the wheels. The suspension assembly includes a connection point or steering knuckle associated with each wheel providing an axis about which the wheel rotates and carried by a control arm assembly pivotally associated with a cross member which is attached to the vehicle frame. A control arm and a biasing or spring assembly operatively connected to the control arm are provided such that when the control arm is pivotally displaced, the biasing assembly dampens the shock of the displacement to minimize or prevent transmission throughout the vehicle.

With a more specific view towards prior art suspension systems, a widely used form of suspension system employs a rigid cross member or assembly attached to the vehicle frame having a pivotal control arm assemblies pivotally attached to opposed ends of the cross member. As the vehicle makes a turn, the body of the vehicle tends to roll away from the direction of the turn. In order to dampen or minimize the rolling effect, a stabilizing assembly or system such as a torsion bar has been used to transfer a portion of the energy resulting from the rolling action from one side of the vehicle to the other. Prior art torsion bars are generally constructed using a heavy gauge, steel bar or group of bars which are attached to the suspension assembly so that a degree of road shock and roll energy is transferred to twisting the torsion bar. Such a torsion bar mounts to the frame or chassis and to control arms at opposite ends.

The energy or force transferred to twisting the torsion bar can be rather substantial. In this regard, prior art torsion bars are typically large, heavy steel bars in order to achieve the necessary spring force to resist or counteract such forces and control body roll. Such prior art torsion bars may weigh 7–15 lbs. or more. These prior art torsion bars occupy considerable space within the engine compartment and in the rear suspension area and may extend away from the suspension assemblies to provide sufficient clearance for twisting.

Another problem with prior art torsion bars is that such stabilizing assemblies are sensitive to single wheel impacts. In this regard, when a single wheel of the suspension is impacted, the torsion bar twists significantly. When the torsion bar relaxes, the spring rate or potential energy which was transferred to the torsion bar is combined with the suspension's spring rate. As such, prior art torsion bars may actually produce a jostling effect in single wheel impacts. This condition has a very negative effect on the ride comfort for the occupants of the vehicle and the handling of the vehicle.

Prior art torsion bars may also be designed to be adjustable such that a desired torsional resistance may be preloaded into the bar to adjust the amount of force required to twist the bar. The adjustable torsion bars often require two large, heavy metal bars, one each mounted to a corresponding control arm assembly and extending inwardly adjacent to the suspension assembly. Each bar terminates at spaced apart locations on the frame and includes an adjustable mounting member. The mounting members for such an adjustable torsion bar assembly can be quite cumbersome and heavy in order to sufficiently mount and resist the twisting forces associated with the corresponding torsion bar.

As can be appreciated from the above brief description, prior art torsion bars respond not only to roll forces but also to single wheel impact forces. Such torsion bars are usually quite heavy, occupy considerable space and thus, require many design considerations in order to accommodate the characteristics of the heavy weight and considerable space usage associated with such torsion bars. Additionally, such prior art torsion bars involve substantial manufacturing costs and component tracking and storage overhead due to the large dimensional size and weight of such torsion bars and the numerous components required to attach and/or adjustably secure such torsion bars.

It would be desirable to isolate single wheel impact action from roll action and to substantially reduce the weight associated with and space occupied by a stabilizing assembly while maintaining the desired force dampening effects. Many new vehicles require improved safety features and greater fuel efficiency. Weight and space saved by reducing the space used and weight added by a torsion assembly could be utilized for safety features or to minimize overall vehicle weight and size thereby improving fuel efficiency.

For the foregoing reasons, there is a need for a stabilizing system for use with a suspension system which substantially reduces the weight associated with the stabilizing system and substantially minimizes the space occupied by such a system. The benefits of such a stabilizing system could substantially improve the space utilization and reduce the weight associated with a vehicle and provide expanded design choices with regard to space and vehicle weight.

OBJECTS AND SUMMARY

A general object of the present invention is to provide a stabilizing system for use with a vehicle suspension which uses a tensionable strap to transfer a given force on one wheel to the opposite wheel.

Another object of the present invention is to provide a stabilizing system for use with a vehicle suspension which is light weight and occupies a small space within the vehicle suspension.

Yet another object of the present invention is to provide a stabilizing system for use with a vehicle suspension which is adjustable to preload the assembly.

Briefly, in accordance with the foregoing, the present invention envisions a stabilizing system for use with a vehicle suspension which employs a first and second strap or other flexible tension member associated with and extending between opposite control arm assemblies of the suspension. A first end of each strap is anchored to a corresponding control arm assembly. A second end, distal the first end, of each strap is anchored to the control arm assembly distal the first end. Each strap, alternately, weaves over and under at least two guides associated with and positioned between the path of the straps. The guides and/or bushings associated with the anchor points may be formed of a yieldable material to provide a yieldable biasing action on the straps. An adjustment assembly is associated with each strap to preload the associated strap to a desired tension. The stabilizing system occupies space between the control arm assemblies and is very lightweight due to the thin belt-like characteristics of the straps. The stabilizing system of the present invention functions to transfer forces imposed on one control assembly to the opposite control arm assembly by alternately placing an associated strap in tension or allowing the other strap to go slack. The flexible tension members or straps are preferrably connected to the control arms at locations tending to minimize the effect of single wheel impact loads.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 2 is a partial fragmentary perspective view of a generalized vehicle suspension employing another embodiment of the stabilizing system;

FIG. 3 is a plan view of the suspension shown in FIG. 2;

FIG. 6A is an enlarged partial fragmentary cross sectional view of one of the anchor points having a bushing retained thereon with a strap attached thereto; and FIG. 6B is an enlarged perspective view of a strap passing over a guide associated with a corresponding pivot shaft.

DETAILED DESCRIPTION OF THE PREFERRED EMBODIMENT

Figure 1:
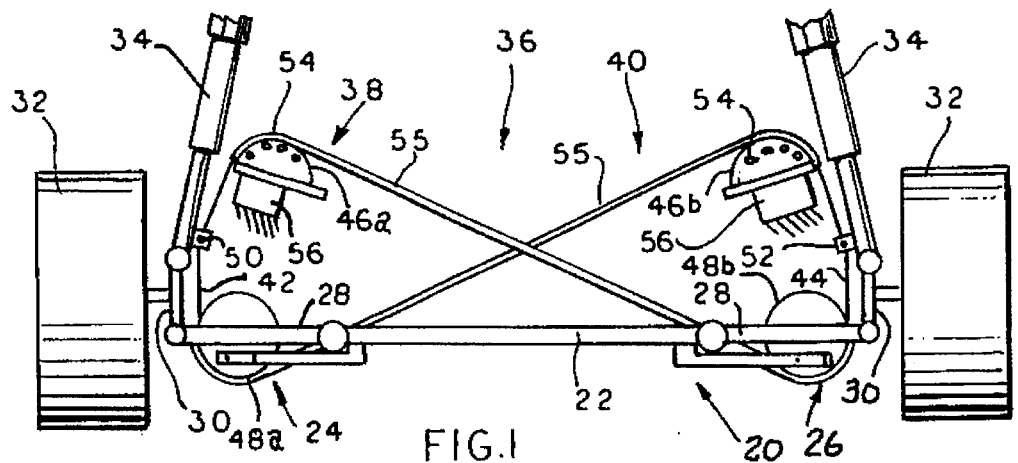
FIG. 1 is a partial fragmentary front elevational view of a generalized schematic of a vehicle suspension showing a stabilizing system associated with the vehicle suspension.

While the invention may be susceptible to embodiment in different forms, there is shown in the drawings, and herein will be described in detail, embodiments with the understanding that the present description is to be considered an exemplification of the principles of the invention and is not intended to limit the invention to that as illustrated and described herein.

FIG. 1 shows a suspension assembly 20 which is operatively associated with a vehicle (not shown). The suspension assembly 20 includes a cross-member 22 which, in use, is mounted to the frame or chassis of the vehicle, and a first and second control arm assembly 24,26 disposed on the outboard ends of the cross-member 22. Each of the first and second control arm assemblies 24,26 includes at least one suspension arm 28 operatively attached to the cross-member 22 at the respective end, a steering knuckle assembly 30 including a depending wheel 32, and a strut 34 operatively attached to the steering knuckle 30.

The present invention envisions a stabilizing system 36 for use with a suspension system and includes first and second means 38,40 for tensionably linking the first and second control arm assemblies 24,26. The stabilizing system 36 functions to displace a force imposed on one of the control arm assemblies to the other control arm assembly. As shown in FIG. 1, the first and second linking means 38,40 include a corresponding first and second elongated flexible member or strap 42,44 and first and second guide means 46,48 associated with each of the first and second straps 42,44. Both of the straps 42,44 are attached to a first anchor 50 which is mounted on the first control arm assembly 24 and a second anchor 52 which is mounted on the second control arm assembly 26.

With further reference to FIG. 1, each of the linking means 38,40 is a mirror image of the other. In this regard, the first strap 42 is attached to the first anchor 50 and extends upwardly over the first guide means 46a, associated with the first control arm assembly 26 and then downwardly towards the second control arm assembly 26 and underneath the second guide 48b whereupon it attaches to the second anchor 52. The second strap 44 follows a course through the suspension which is a mirror image of the course weaved by the first strap 42. The second strap 44 is attached to the second anchor 52 and extends upwardly over the first guide 46b associated with the second control arm assembly 26 and then across the suspension and underneath the second guide 48a associated with the first control arm assembly 24 and upwardly therefrom to connect to the first anchor 50. In summary, the first strap 42 follows a weaved course over the first guide 46a and under the second guide 48b and connects to the second anchor 52. Similarly, the second strap 44 follows a weaved course over the first guide 46b under the second guide 48a and connects to the first anchor 50.

The first guides 46a,46b are formed of a material which is yieldable such that when a force is imposed on the corresponding strap 42,44, the corresponding first guide 46a,46b is compressed thereby dampening forces transferred thereto by the corresponding strap 42,44. The second guides 48a,48b may also be formed of a yieldable material to provide additional dampening effects. The guides 46a, 46b,48a,48b are formed of an elastomeric material such as an appropriate urethane or rubber composition. As shown in FIG. 1, the first guides 46a,46b, are cored 54 to provide proper compression characteristics or such compression characteristics may be achieved solely by the composition of the material.

With further regard to materials used in the present invention, the straps 42,44 are formed of a material which provides a suitable tensile strength over numerous tensioning cycles. While steel and metal alloy straps or cables may be used, other materials such as an appropriate plastic material or composite material may be used. In order to provide additional dampening effects, a strap 42,44 may be constructed of a material which has a degree of elasticity. Additionally, sleeves 55 may be positioned over the straps 42,44 to reduce the friction between the strap 42,44 and the corresponding first and second guides 46A,46B,48A,48B. Additionally, the sleeve 55 will protect the straps 42,44 from incidental damage.

Figure 5:
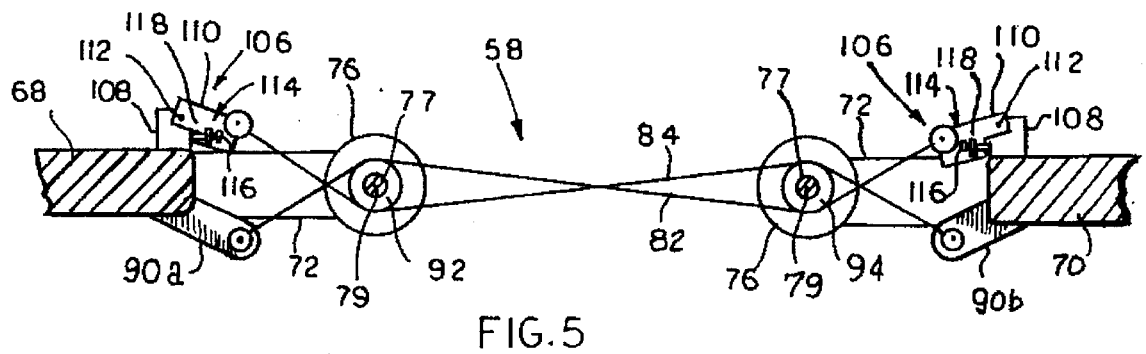
FIG. 5 is a simplified schematic representation of a stabilizing system which is substantially similar to the system as shown in FIG. 4 further incorporating an adjustment assembly to adjustably set the pre-loaded tension in straps used in the system.

An adjusting mechanism 56 is operatively associated with the first guide means 46a,46b to controllably adjust the position of the first guides 46a,46b thereby increasing or decreasing the tension in the corresponding straps 42,44 and compression of the guides 46a,46b,48a,48b. The adjusting mechanism 56 is of a known construction such as a mechanical lever driven by a threaded shaft as shown in FIG. 5 and discussed in greater detail hereinbelow. Advancement of the threaded shaft relative to the body of the adjusting mechanism 56 precisely adjusts the position of the guides 46a,46b. The ability to adjust the tension in the stabilizing system allows the system to be tuned to produce a desired ride or handling characteristic.

In use, the stabilizing system 36 associated with the suspension system 20 as shown in FIG. 1 displaces a given force imposed on one of the wheels 32,32 to the opposite wheel. In displacing the force, the energy is dampened by means of the yieldable characteristics of the first and second guide means 46a,46b,48a,48b. The stabilizing system 36 is less sensitive to single wheel impact such that the first and second linking means 38,40 are interconnected by the common connections to the first and second anchors 50,52 and the dampening effect provided thereby.

FIGS. 2–6B show a second form of the stabilizing system as generally disclosed hereinabove. The stabilizing system 58 is constructed for use with a vehicle suspension 60 as shown in FIGS. 2–6B. Such a suspension system includes a first and second control arm assembly 62,64 which are pivotally attached to opposite ends of a cross-member 60. The control arm assemblies 62,64 include corresponding first and second bifurcated control arms 68,70 each having two spaced apart branches 72,72 which join in a common connecting head 74. The connecting head 74 is operatively associated with a steering knuckle (not shown) of known construction and may include a shock absorbing assembly of known construction (not shown) operatively associated with the recess 75 in the connecting head 74. Each of the branches 72 terminates in a pivot knuckle 76 and a pivot shaft 77 extends through the two pivot knuckles 76 of each control arms 68,70 and through corresponding portions of the cross-member 66 to provide a pivoting action between the control arms 68,70 and the cross-member 66.

The construction of bifurcated control arms 68,70 pivotally attached to a cross-member 66 is known in the art and provides a structural foundation for the present invention. The present invention positions the stabilizing system 58 between the control arm 68,70 to minimize the space utilized and to provide a stabilizing system 58 which is highly responsive to vehicle roll yet is less sensitive to wheel impacts. As shown in FIG. 2, the stabilizing system 58 includes a first and second means 78,80 for tensionably linking the oppositely disposed first and second control arms 68,70. The first and second linking means 78,80 include a first and second flexible elongated strap 82,84 extending between and attached to a medial portion 86 located between the branches 72,72 of the control arms 68,70. A first and second anchor 88,90 are attached to the medial area 86 of each control arm 68,70. The first and second anchors associated with the first control arm are identified as first anchor 88a and second anchor 90a and the first and second anchor associated with the second control arm 70 are identified as first anchor 88b and second anchor 90b. The straps 82,84 weave between the anchors 88a,90b and 88b,90a under and over first guide means 92 retained proximate to the first control arm 68 and under and over second guide means 94 retained proximate to the second control arm 70.

The first strap 82 is attached to the second anchor 90a and extends upwardly over the first guide 92 towards the second control arm 70. The strap 82 then weaves under the second guide 94 and upwardly to the first anchor 88b. Similarly, the second strap 84 attaches to the first anchor 88a and extends downwardly under the first guide 92 towards the second control arm 70 and weaves over the second guide 94 and then downwardly to connect to the second anchor 90b. In other words, the first and second straps 82,84 weave mirror image paths between the first and second anchors 88,90 attached to the spaced apart control arms 68,70. As can be seen in the illustrations, the first anchors 88a,88b are positioned relative to the corresponding guides 92,94 so that the strap anchored thereto follows a course downwardly to pass under the corresponding guide. In a similar manner, the second anchors 90a,90b are positioned so that the strap anchored thereto must extend upwardly therefrom to pass over the corresponding guide. Further, the first and second guides 92,94 are retained on the corresponding pivot shafts 77,77.

FIGS. 6A and 6B provide enlarged detailed views of the first strap attached to the first anchor 88b and the first strap 82 passing over the first guide 92. FIG. 6A provides a partial fragmentary cross sectional view through the first anchor 88b. As shown in FIG. 6A, the strap 82 wraps around a bushing 96 which is pivotally retained on an anchor bracket 97 of the anchor 88b. The strap 82 wraps around the bushing 96 and is secured by means of a buckle or crimping fastener 98 of known construction. With regard to FIG. 6B, a single bushing of the first guide 92 is shown rotatably positioned on the pivot shaft 77 with the strap 82 passing thereover. Each of the guides 92,94 includes two bushings, one each associated with the corresponding strap overlying or passing thereunder. The first guide 92 is representative of the first and second guides 92,94. The guides 92,94 are formed of an elastomeric material such as urethane or a rubber composition which has a desired degree of compressibility so that the guide 92,94 yields when a force is applied thereto upon tensioning the corresponding strap 82,84. As will be discussed with further detail hereinbelow, the yieldability of the guides 92,94 is important to the functioning of the present invention.

Figure 4:
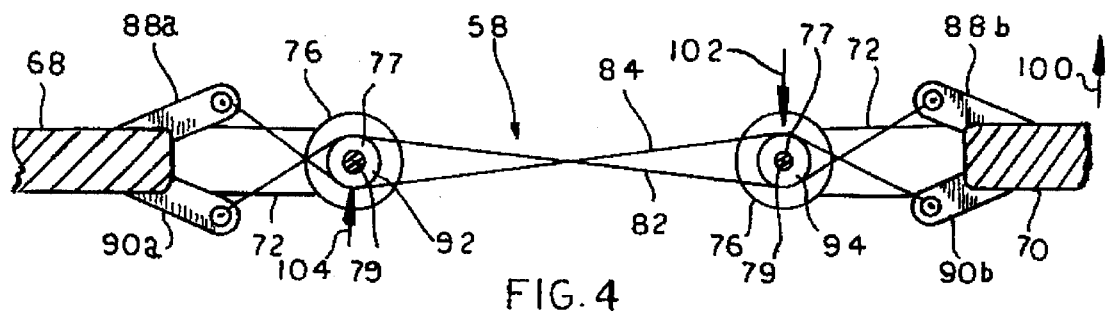
FIG. 4 is a simplified schematic representation of the stabilizing system as shown in FIGS. 2 and 3.

FIG. 4 provides a simplified schematic cross sectional view taken along line 4—4 in FIG. 3. In use, the stabilizing system 58 of the present invention provides dual compensating stabilization of forces applied to the control arms 68,70. For example, with reference to control arm 70 an upward force (as indicated by arrow 100) will rotate the control arm 70 about the pivot shaft 77 thereby rotating and displacing the second anchor 90b away from the second guide 94. Displacement of the second anchor 90b imposes a downward force (as indicated by arrow 102) on the second guide means 94 and an upward force (as indicated by arrow 104) on the first guide 92. Since the first and second guides 92,94 are yieldable, forces 102 and 104 are dampened or absorbed to minimize transmission to the vehicle.

Forces which are displaced by the stabilizing system 58 originate generally at the connecting head 74 of the control arms 68,70. The dimensional relationship of the control arms 68,70 and the anchors 88a,88b,90a,90b relative to the pivot shaft 77 promotes stability in control and results in a stabilizing system 58 which is substantially less sensitive to single wheel impact. Large displacements which occur at the connecting head end 74 translate into much smaller displacements at the anchors 88,90. A substantial portion of the forces imposed on the stabilizing system 58 are dampened or dissipated by the yieldable properties of the first and second guides 92,94.

Additionally, the present invention occupies substantially less space than prior art stabilizing systems. The thin band-like construction and dimensions of the straps 82,84 occupy very little space and can be woven through openings in the cross-member 66 as shown in FIGS. 2 and 3. The efficient space utilization of the present invention further broaden other design considerations by vacating space which was once occupied by large cumbersome prior art systems. Furthermore, the overall weight of the stabilizing system 58 is approximately 3 lbs. including the bracket portions of the anchors, bushings, guides, and straps. The present invention results in a vehicle weight savings of approximately 5–10 lbs. over prior art systems.

As an additional matter, the stabilizing system 58 as shown in FIGS. 2–4 may also include an adjustment assembly 106. The adjustment assembly 106 replaces the first or second anchors. In FIG. 5 the first anchors 88a,88b have been replaced. The adjustment assembly 106 includes a base bracket 108 attached to the respective control arms 68,70, a pivot bracket 110 pivotally attached to the base bracket 108 by means of a pivot pin 112, and an adjustment means 114 which is shown as a threaded shaft 116 which bears against the a surface of the base bracket 108. The bushing 96 is pivotally retained on the pivot bracket 110 in a manner as discussed with reference to FIG. 6A. The strap is buckled to the bushing 96 and extends from the adjustment assembly 106.

The threaded shaft 116 is advanced through a cooperatively threaded nut portion 118 fixed to the pivot bracket 110 to advance or retreat relative to the base bracket 108. For example, if tension in the system should be increased, the threaded shaft 116 is advanced through the nut portion 118 against the base bracket 108 to rotate the bushing 96 upwardly relative to the pivot pin 112 thereby increasing the tension in the system. The adjustment assembly 106 provides the ability to fine tune the sensitivity of the stabilizing system by increasing or decreasing the normal or preloaded tension in the straps 82,84. The ability to adjust the system can provide a soft rate to a firm rate ride by adjusting the preload tension in the straps.

In use, the first and second straps 82,84 connect to the first and second control arms 68,70 of the vehicle suspension assembly 60. The straps are weaved over and under the first and second guides 92,94 and terminate in respective first and second anchors 88,90 attached to the control arms 68,70. When cornering, the vehicle's body is subjected to forces which induce a rolling motion. The stabilizing system 58 restricts this motion by displacing forces generated by the rolling motion on one wheel to the other wheel.

For example, when the vehicle makes a right turn (the second control arm 70 being the right side of the vehicle), the body tends to roll to the right side thereby imposing forces on the control arm 70. The forces tend to pivot the control arm 70 upwardly relative to the cross-member 66 thereby rotating the first anchor 88b relative to the pivot shaft 77 to place the first strap 82 in tension. With increasing vehicle body roll, the tension in the strap increases. The resulting strap tension induces upward forces on the second guide 94 and downward forces on the first guide 92. The resulting roll couple acts to restrict the rolling motion of the vehicle body which is rigidly attached to the cross-member 66.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A stabilizing system for use with a vehicle primary suspension system having at least two oppositely positioned control arm assemblies, said stabilizing system controlling side-to-side weight transfer of the vehicle said stabilizing system comprising:

first and second means for tensionably linking said first and second control arm assemblies for tensionably transferring a force imposed on one of said control arm assemblies to the other of said control arm assemblies for controlling side-to-side weight transfer to stabilize the vehicle;

said first and second linking means including first and second elongated flexible members operatively connectable with and extending between said first and second control arm assemblies; and first and second means for guiding said elongated flexible members connectable with each of said first and second control arm assemblies, each of said elongated flexible members alternately weaved over and under said first and second guide means.

2. A stabilizing system as recited in claim 1, wherein said at least one of said first and second guide means are formed of a yieldable material, said at least one of said first and second guide means having a degree of compressibility for dampening forces transferred thereto by said first and second elongated flexible members.

3. A stabilizing system as recited in claim 1, wherein said first and second linking means are a pair of elongated flexible straps, a first end of each of said straps being operatively connectable with a corresponding one of said control arm assemblies, a second end of each of said straps being operatively connectable with a corresponding opposed control arm assembly, said straps following mirror image courses between said first and second control arm assemblies.

4. In a vehicle suspension system including a pair of opposed control arm assemblies, a stabilizing system for controlling side-to-side weight transfer of the vehicle, said stabilizing system comprising:

a first and second elongated flexible member associated with and extending between said opposed control arm assemblies, said first and second flexible members being tensionable for tensionably displacing a force imposed on one of said control arm assemblies to the other of said control arm assemblies for controlling side-to-side weight transfer to stabilize the vehicle;

a first and second end of each of said first and second flexible members, said first and second ends of said first and second flexible members being operatively associated with a corresponding one of said control arm assemblies; and first and second guides operatively associated with each of said control arm assemblies, said first and second flexible members being weaved over a corresponding first guide associated with one control arm assembly and weaved under a corresponding second guide associated with the opposed control arm assembly, said first and second flexible members following mirror image weaving courses over and under said first and second guides between said opposed control arm assemblies.

5. A stabilizing system as recited in claim 4, wherein said first guides are formed of a yieldable material for providing a resilient biasing action against a corresponding flexible member when said flexible member is tensioned.

6. A stabilizing system as recited in claim 4, further comprising an adjustment assembly operatively associated with each of said first and second flexible members for controllably adjusting the tension in the corresponding flexible member.

7. A stabilizing system as recited in claim 4, further comprising a friction reducing sleeve covering a portion of each of said first and second flexible members adjacent said first and second guides for reducing the friction forces between said first and second flexible members relative to said first and second guides.

8. A stabilizing system for a vehicle wheel suspension including first and second opposed control arm assemblies, said stabilizing system comprising:

first and second anchor means operatively associated with said first and second control arm assemblies, respectively, said first and second anchor means being spaced apart;

first and second guide means operatively associated with each of said first and second control arm assemblies, said first and second guide means being positioned between said spaced apart first and second anchor means;

a first flexible member having opposite ends respectively connected to said spaced apart first and second anchor means;

a second flexible member having opposite ends respectively connected to said spaced apart first and second anchor means;

said first flexible member extending from said first anchor means upwardly over said first guide means associated with said first control arm assembly, then downwardly beneath said second guide means associated with said second control arm assembly and then upwardly to said second anchor means;

said second flexible member extending from said second anchor means upwardly over said first guide means associated with said second control arm assembly, then downwardly beneath said second guide means associated with said first control arm assembly and then upwardly to said first anchor means;

rolling of the vehicle in a first direction causing tensioning of said first flexible member, downward pressure on said first guide means associated with said first control arm assembly and upward pressure on said second guide means associated with said second control arm assembly for resisting such vehicle rolling, and rolling of the vehicle in an opposite direction causing tensioning of said second flexible member, downward pressure on said first guide means associated with said second control arm assembly and upward pressure on said second guide means associated with said first control arm assembly.

* * * * *